May 2, 1961 G. H. ELLIOTT 2,982,931
POTENTIOMETER
Filed April 27, 1959
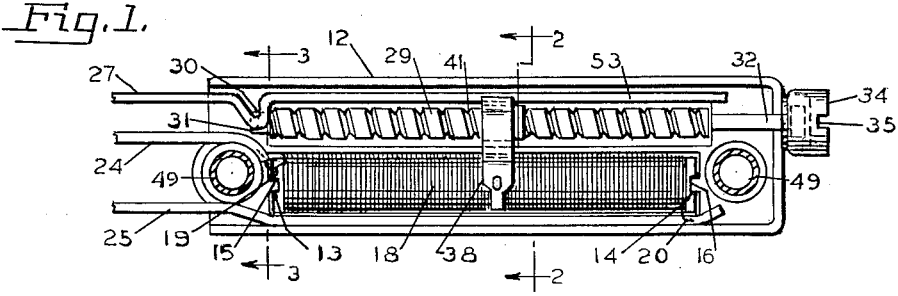
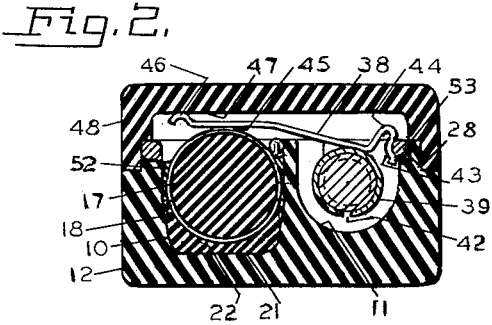 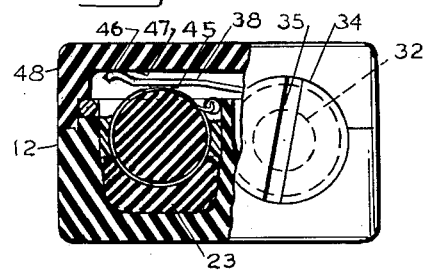
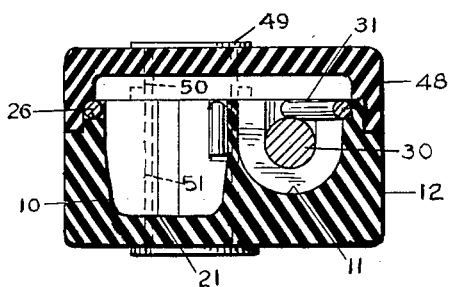 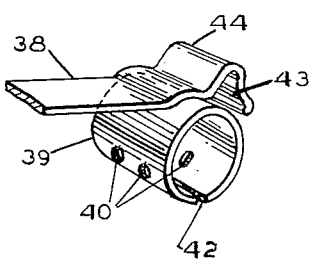
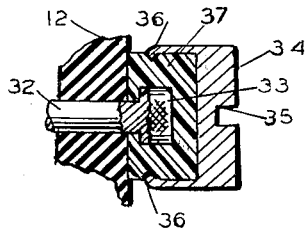
INVENTOR.
George H. Elliott
BY R. E. Geauque
ATTORNEY.

United States Patent Office 2,982,931
Patented May 2, 1961

2,982,931
POTENTIOMETER

George H. Elliott, Van Nuys, Calif., assignor to Atohm Electronics, Sun Valley, Calif., a corporation of California Filed Apr. 27, 1959, Ser. No. 808,967
5 Claims. (Cl. 338—183)

The present invention relates to potentiometers and, more particularly, to a ruggedized potentiometer attaining a high degree of accuracy and dependability even in a miniaturized form.

It has long been a problem to attain accuracy and dependability in electronic components operated under a wide range of environmental conditions. This problem has been accentuated in recent years with the development of highly complex electronic systems such as computers. Temperature variations and shock and vibration conditions are often extreme, resulting in variations in the predicted operating characteristics. A relatively slight inaccuracy of an electronic component in a complex system may cause complete failure of the entire system when the data obtainable is critical.

With particular reference to potentiometers, one of the problems has been the maintenance of a consistent frictional contact between the resistance element and the wiper element. Those potentiometers which solve the problem by having the wiper element in gripping engagement with the resistance element require spatial separation of each turn of the resistance wire winding in order to permit the wiper element to wrap around the wire; however, the size requirements for such potentiometers are excessive. In miniaturized potentiometers, the resistance element is so constructed that the wiper element can only be pushed against the resistance element. Usually, the wiper element is spring biased against the resistance element, such spring action being attained either in the wiper element itself or by separate means. In either event, mechanical shock or vibration causes the wiper element to jitter and often mechanically oscillate at its natural frequency, whereby the electrical contact with the resistance element becomes intermittent. A similar problem is encountered with respect to a sliding contact between the wiper element and either a terminal means or a lead screw performing the added function of an electrical terminal.

Another problem found in connection with potentiometers has been the maintenance of a running seal between the casing and the externally protruding shaft of the lead screw upon which the actuating head is secured. Further, it is often desirable that the lead screw be electrically insulated from its actuating head in order to avoid the introduction of extraneous signals picked up by the actuating head or the adjusting element used therewith.

An additional problem is encountered in connection with miniaturized potentiometers, particularly when used in adverse environments which require complete enclosure of the operating parts. The heat generated in the resistance element by the flow of current therethrough can cause unpredictable variations in the predetermined resistivity, as well as expansion of mechanically cooperable elements disposed within the casing, unless means are provided for adequate dissipation of such heat.

A still further problem resides in the difficulty of manufacturing a potentiometer having elements which are universally usable with all values and, hence, sizes of resistance elements within a broad range and do not change their exact arrangement and operation with such varying sizes.

Therefore, it is one of the objects of the present invention to provide a potentiometer having a simplified construction for the elimination of error-introducing elements to increase both accuracy and dependability of operation.

Another object of this invention is the provision of a potentiometer having a wiper arm which is completely restrained against mechanical oscillation and vibration.

A further object of the present invention is to provide a potentiometer with electrical terminals disposed for maximum dissipation of any heat generated within the potentiometer.

A still further object of this invention is the provision of a potentiometer with a running seal between the casing and an external actuating head secured to the internal adjustment means such as a lead screw.

A still further object of the present invention is to provide a potentiometer construction adapted for ease of manufacturing and simplicity of assembly with any one of a broad range of resistive values and sizes of resistance means.

An additional object of this invention is the provision of a potentiometer having a wiper means construction such that two separate electrical output paths are provided for the wiper means.

A still further object of the present invention is the provision of a potentiometer construction adapted for the filling of a maximum portion of the internal cavity with a substance to minimize the air space, such substance having a higher coefficient of heat conductivity than air, thereby increasing the heat dissipation and decreasing the possibilities of dust admittance. Such substance further functions to prevent movement and, hence, disassociation of relatively secured elements.

Another object of the present invention is the provision of a potentiometer with a novel wiper arm construction whereby the wiper pressure on the resistance element is constant over the entire range of operation.

A further object of this invention is the provision of a potentiometer having a novel wiper means construction for the elimination of backlash.

Another object of the invention is the provision of a novel wiper means construction whereby the wiper means will ratch with respect to the lead screw at the end of wiper means travel to prevent binding of the wiper means.

According to the present invention, a potentiometer is provided with a casing comprising a bottom member and a cover member, the bottom member having two parallel longitudinal cavities therein. One of the cavities is adapted to contain the resistance windings and the longitudinal mandrel therefor. The second cavity is adapted to contain a longitudinal lead screw which is journaled in the casing at both ends. One end of the screw projects through the casing and is provided with a knurled head. An actuating head is disposed about the knurled head so as to provide a cavity therebetween, such cavity being filled with a high temperature insulating material, such as Kel-F or Teflon, for a running seal between the actuating head and the casing at the point of projection of the screw from the casing. A first terminal is secured to the casing at one end thereof and electrically connected to the nearest end of the resistance element. A second terminal projects from the casing adjacent to the first terminal and runs the entire internal length of the casing to the other end of the resistance element for electrical connection thereto. A third terminal projects from the casing adjacent to the first and second terminals and runs the entire internal length of the casing adjacent to the second cavity therein and parallel to the screw. The third terminal is in electrical contact with the screw at the end thereof adjacent the point of projection of the third terminal from the casing. A wiper arm is in slidable engagement at one end thereof with the resistance element and, at the other end thereof, with the third terminal, and is provided with a cylinder disposed about the screw and having internal means for engagement with the thread grooves of the screw. The wiper arm has a configuration such that the casing cover member slidably engages and tends to depress the end of the wiper arm in slidable engagement with the resistance element, the portion of the wiper arm provided with the cylinder is a fulcrum point, and the remaining end of the wiper arm is spring biased against the third terminal. The resistance element and its mandrel are sealed into the first cavity by an epoxy resin. Such cavity is dimensioned for receiving a variety of different diameters of resistance elements and mandrels, the diametrical spatial differences being compensated by spacer blocks so that the distance between the resistance element and the casing cover remains the same, independent of resistance element and mandrel size, thus providing positive contact between the wiper arm and the resistance element. The mandrels have the same length and are provided with end grooves for engaging mating projections of the casing's bottom member into the first cavity.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which, Figure 1 is a top plan view of a potentiometer in accordance with the present invention, the casing cover member being removed;

Figure 2 is an enlarged sectional end view, partly in elevation, as seen along line 2—2 in Figure 1, with the cover member in place;

Figure 3 is an enlarged sectional end view as seen along line 3—3 in Figure 1, with the resistance element and its mandrel removed, and the cover member in place;

Figure 4 is an enlarged fragmentary perspective view of a portion of the wiper arm and its screw-mounted cylinder;

Figure 5 is an enlarged sectional end view, partly in elevation, similar in aspect to Figure 2, showing the disposition of a smaller mandrel and resistance element with a spacer block; and Figure 6 is an enlarged fragmentary sectional view showing the actuating head and running seal of Figure 1.

Referring to the drawing, a potentiometer is shown having first and second longitudinal parallel cavities 10 and 11, respectively, located in the casing's bottom member 12. The bottom member 12 is provided with vertical projections or keys 13 and 14 projecting into the cavity 10 at the opposite ends thereof and adapted to slidably engage end grooves or keyways 15 and 16, respectively, of a mandrel 17 upon which a resistance element 18 is located. The resistance element 18 is preferably in the form of a wire wound upon the mandrel 17 and having ends 19 and 20 located at opposite ends of the cavity 10. The mandrel 17 may be of such a size as to rest upon the bottom surface 21 of cavity 10 or, as shown in Figure 2 or Figure 5, may rest upon a spacer block 22 or 23, respectively, as will be explained more fully hereinafter. A first terminal 24 is secured to the end 19 of resistance element 18, and a second terminal 25 is secured to the end 20 of resistance element 18. Terminal 25 rests upon a shoulder 26 of the bottom member 12 and extends through substantially the entire internal length of the potentiometer parallel to the resistance element 18. A third terminal 27 rests upon a shoulder 28 adjacent the second cavity 11 and extends along the length thereof.

A lead screw 29 is disposed in the second cavity 11 and has an end portion 30 journaled in the bottom member 12 and in contact with a bent portion 31 of terminal 27. The other end or shaft 32 of the screw 29 projects through the bottom member 12 and is provided with a knurled head 33. An actuating head 34 has a screwdriver slot 35 and is provided with a plurality of portions 36 circumferentially disposed and adapted to be swaged into an insulating substance 37, such as Kel-F or Teflon, which fills and overflows the cavity in the actuating head 34 around the screw head 33 so as to make a running seal against the casing around the screw shaft 32.

The wiper means comprises a resilient wiper arm 38 provided with a cylinder 39 disposed about the lead screw 29 and in engagement therewith by means of a plurality of dimples 40 residing in the thread depressions or grooves 41 of screw 29. The cylinder 39 may have an inner diameter slightly greater than the outer diameter of lead screw 29 or may be a resilient split cylinder as shown with the split 42 running longitudinally near the bottom of the cylinder, in either event permitting ratching of the dimples 40 from one screw groove 41 to the next such groove in an axial direction when the wiper means has traversed the lead screw 29 to either end thereof and rotation of such screw is continued in a direction tending to cause the cylinder 39 to ride off the end of the screw. The wiper arm 38 is provided at one end thereof with a portion 43 having a configuration adapted for slidable engagement with the terminal 27 along the length thereof parallel to lead screw 29. A bent portion 44 causes the terminal contact portion 43 to be resiliently urged against the terminal 27. The wiper arm 38 is provided near its other end with a downwardly projecting portion 45 adapted for slidable engagement with the resistance element 18. The extremity 46 of such other end is adapted to slidably engage the bottom surface 47 of a cover member 48. The cover member 48 is shouldered to engage the complementary shoulders of the bottom member 12 of the casing. The cover member 48 is secured to the bottom member 12 by means of rivets 49 passing through registered apertures 50 and 51 of cover member 48 and bottom member 12, respectively.

All of the conductive elements may be made of the same material, such as stainless steel, so that the coefficients of expansion will be the same to minimize binding effects during temperature variations.

Because of the extension of terminals 25 and 27 throughout the entire internal length of the casing, heat transfer from the resistance element 18 and the external dissipation of such heat is maximized. In addition, the contact between the end 30 of lead screw 29 and the terminal 27 at its bent portion 31 facilitates the transfer of heat from the lead screw 29 to such terminal 27 for dissipation therefrom. Further, the air space in the cavity 10 not otherwise occupied by the mandrel 17, the resistance element 18 and the spacer block 22 or 23 may be filled with an epoxy resin 52 or similar substance. Such a resin has a greater coefficient of heat conduction than just the air otherwise filling such space and aids in the heat conduction and dissipation.

The configuration and relative dimensions of the wiper arm 38 illustrated are such that the bottom surface 47 of the cover member 48, by depressing the end portion 46 of the wiper arm 38, maintains the projection 45 in contact with the resistance element 18 at all times, thus eliminating any opportunity for the projection 45 to become disassociated electrically from resistance element 18 due to shock or vibration, oscillatory or otherwise.

The cylinder 29 may be spot-welded to the wiper arm 38. The dimples 40 are disposed on opposite sidese of the split 42 which is located substantially oppositely in the cylinder 39 from the wiper arm 38. Thus, the cylinder 39 acts as a gripping spring about the screw 29 to maintain the dimples 40 in engagement with the grooves 41 of the screw 29. However, upon disposition of the cylinder 39 at either extreme end of the screw 29, continued forced rotation of the screw 29 causes the dimples 40 to ride up and over the enlarged diameter portions of the screw until they engage the grooves again, the effective diameter of the cylinder 39 becoming increased during this occurence by virtue of the cylinder's resiliency as permitted by the split 42.

The portion 53 of terminal 27 parallel to lead screw 29, and lead screw 29 itself, provide two parallel output paths for the current through wiper arm 38 from the resistance element 18, thus both assuring the existence of an output path and also minimizing the resistance thereof. Such minimal resistance of the wiper output path offers the advantages of increased accuracy of predetermined potentiometer resistance values and also decreased amount of heat generated within the casing.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A potentiometer comprising: a casing having a bottom member and a cover member secured to each other, said bottom member having first and second longitudinal parallel cavities; resistance means disposed in said first cavity and having first and second leads at opposite ends thereof; first, second and third terminals secured to said bottom member and projecting therefrom at a common end thereof, said first terminal being secured to said first lead, said second terminal extending throughout the effective length of said bottom member parallel to said first cavity and secured at its internal end to said second lead, said third terminal extending throughout the effective length of said bottom member parallel to said second cavity; conductive lead screw means disposed substantially within said second cavity and having one end projecting through said casing and provided with an exterior actuating head, said screw means having another end journaled within said bottom member; said third terminal having a bent portion in electrical contact with said other end of said screw means; wiper means in threaded engagement with said screw means for longitudinal movement thereby and having one end in slidable engagement with said third terminal and a portion at the other end of said wiper means in slidable engagement with said resistance means; and said cover member having a bottom surface in slidable engagement with said other end of said wiper means for maintaining said portion of said wiper means in engagement with said resistance means.

2. A potentiometer in accordance with claim 1 wherein said screw means is integrally provided with a knurled head and said actuating head is provided with an internal cavity in which said knurled head is disposed in non-contacting relation with respect to said actuating head, and further including a sealing substance disposed within said actuating head cavity for sealing said actuating head to said knurled head and overflowing said cavity for providing a running seal between said actuating head and said casing.

3. A potentiometer in accordance with claim 1 wherein said wiper means includes a resilient cylinder substantially concentrically disposed about said screw means, said wiper means being secured to said cylinder at one portion of the outer surface thereof, said cylinder being provided with a plurality of longitudinally separated dimples inwardly disposed in threaded engagement with said screw means, and said cylinder having a longitudinal slit substantially diametrically opposed with respect to said dimples.

4. A potentiometer comprising: conductive lead screw means; resistance means disposed in parallel to said screw means and having terminal means; a terminal extending parallel to said screw means along the length thereof and in electrical contact therewith at one end thereof; wiper means in conductive engagement with said screw means for axial movement thereby and having a first end in conductive slidable engagement with said terminal and a second end in conductive slidable engagement with said resistance means; and a casing comprising an upper member and a bottom member, said bottom member retaining said screw means and said resistance means in fixed relationship therewith, and said upper member being assembled and secured to said bottom member and having a bottom surface arranged in pressing slidable engagement with said second end of said wiper means biasing said second end into positive contact with said resistance means in said assembled position.

5. In a potentiometer having lead screw means and resistance means, the combination of resilient wiper means and casing means, said wiper means being in engagement with said screw means for movement thereby and having a free end in slidable engagement with said resistance means for contiuuous electrical contact therewith, said casing means comprising a cover member and a bottom member in closed engagement with each other, said bottom member retaining said resistance means and said screw means in fixed parallel relationship with respect to each other, and said cover member having a bottom surface in engagement with said free end of said resilient wiper means biasing said wiper means free end into positive contact with said resistance means.

References Cited in the file of this patent

UNITED STATES PATENTS

| 538,246 | Fiske | Apr. 30, 1895 |
| 606,012 | Hogan | June 21, 1898 |
| 650,057 | Waters | May 22, 1900 |
| 1,853,798 | Brownell | Apr. 12, 1932 |
| 2,873,338 | Elliott | Feb. 10, 1959 |
| 2,895,116 | Morrison | July 14, 1959 |

FOREIGN PATENTS

| 679,393 | Germany | July 13, 1939 |